United States Patent
Pao et al.

(10) Patent No.: US 10,692,221 B2
(45) Date of Patent: Jun. 23, 2020

(54) AUTOMATIC TRIMAP GENERATION AND IMAGE SEGMENTATION

(71) Applicant: Adobe Inc., San Jose, CA (US)

(72) Inventors: I-Ming Pao, Palo Alto, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 98 days.

(21) Appl. No.: 16/035,410

(22) Filed: Jul. 13, 2018

(65) Prior Publication Data
US 2020/0020108 A1   Jan. 16, 2020

(51) Int. Cl.
G06T 7/194 (2017.01)
G06T 7/90 (2017.01)
G06K 9/62 (2006.01)
G06K 9/38 (2006.01)

(52) U.S. Cl.
CPC ............... *G06T 7/194* (2017.01); *G06K 9/38* (2013.01); *G06K 9/6212* (2013.01); *G06T 7/90* (2017.01); *G06T 2207/20084* (2013.01)

(58) Field of Classification Search
CPC . G06T 7/194; G06T 7/90; G06K 9/38; G06K 9/6212
See application file for complete search history.

(56) References Cited

U.S. PATENT DOCUMENTS

| | | | | |
|---|---|---|---|---|
| 8,175,384 | B1 * | 5/2012 | Wang | G06T 7/194 348/586 |
| 9,202,258 | B2 * | 12/2015 | Greisen | G06T 3/0012 |
| 2012/0294525 | A1 * | 11/2012 | Lukac | G06K 9/40 382/167 |
| 2017/0083762 | A1 * | 3/2017 | Segalovitz | G06K 9/4628 |
| 2019/0340462 | A1 * | 11/2019 | Pao | G06K 9/4671 |

OTHER PUBLICATIONS

Bai et al, "Saliency-SVM: An automatic approach for image segmentation", 2014, Neurocomputing 136 (2014) pp. 243-255 (Year: 2014).*
Wikipedia, "Support Vector Machine" [online], 2019 [retrieved on Dec. 17, 2019]. Retrieved from the Internet: <URL: https://en.wikipedia.org/wiki/Support-vector_machine>, 12 pages (Year: 2019).*
Krahenbuhl, "Efficient Inference in Fully Connected CRFs with Gaussian Edge Potentials", Dec. 14, 2011, 9 pages.

* cited by examiner

*Primary Examiner* — David F Dunphy
(74) *Attorney, Agent, or Firm* — SBMC

(57) ABSTRACT

A digital medium environment is described to automatically generate a trimap and segment a digital image, independent of any user intervention. An image processing system receives an image and a low-resolution mask for the image, which provides a probability map indicating a likelihood that a pixel in the image mask corresponds to a foreground object in the image. The image processing system analyzes the image to identify content in the image's foreground and background portions, and adaptively generates a trimap for the image based on differences between the identified foreground and background content. By identifying content of the image prior to generating the trimap, the techniques described herein can be applied to a wide range of images, such as images where foreground content is visually similar to background content, and vice versa. Thus, the image processing system can automatically generate trimaps for images having diverse visual characteristics.

20 Claims, 10 Drawing Sheets

AUTOMATIC TRIMAP GENERATION AND IMAGE SEGMENTATION

BACKGROUND

Object selection is one of the most commonly used tools in digital image processing. For instance, to visually edit a portion of a digital image without altering visual characteristics of other portions of the digital image, users can select a region of interest by using an input device to define a border of the region. Once selected, image processing applications enable visual properties of the region of interest to be modified, such as by increasing a contrast of the selected region, by altering one or more colors of the selected region, and so forth. However, even for skilled image editing professionals, the manual input required to precisely select a region of interest is tedious and cumbersome, particularly for professional, high-resolution digital images.

To reduce the amount of manual input required for segmenting a region of interest from a remainder of the image (e.g., segmenting a foreground of the image from a background of the image), conventional approaches implement machine learning to automatically classify each pixel in an image as either a foreground pixel or a background pixel. For example, given a picture of a dog (foreground object) in a park (background), a neural network can generate a probability map for the image, where each pixel of the probability map indicates a probability that the pixel corresponds to the dog (foreground object).

Conventional approaches use these neural network probability maps as a baseline for image segmentation and object selection. However, due to hardware computation and memory resource constraints, probability maps suffer from limited output sizes. Thus, conventional approaches are required to first downsample high-resolution (e.g., 7000×5000 pixels) images to an output size of the neural network (e.g., 256×256 pixels). After downsampling, the neural network can be run to generate a probability map for the downsampled image, then the probability map can be upsampled to an original resolution of the image. However, conventional approaches for performing upsampling generate an upsampled probability map that does not accurately account for curved object edges in the full resolution image. To account for curved edges, conventional approaches require users to manually define a trimap for the image, which segments the image into three partitions: definite foreground, definite background, and unknown. Post-processing is then used to assign each pixel in the unknown region to either foreground or background, and the resulting set of foreground or background pixels may be selected as the object or region of interest for editing.

Manually defining a trimap using these conventional approaches, however, is cumbersome and tedious, particularly for high-resolution images where foreground pixel colors are similar to background pixel colors.

SUMMARY

A digital medium environment is described to automatically generate a trimap and perform image segmentation for a given digital image. The techniques and systems described herein increase user efficiency in segmenting the digital image by automating generation of a trimap without requiring any user input to generate the trimap. Similarly, the techniques and systems described herein can utilize the automatically generated trimap to segment an image's foreground from its background for further processing. In one example, a computing device implementing an image processing system receives a digital image to be segmented and an initial low-resolution image segmentation for the image, such as a low-resolution image segmentation generated by a neural network.

The image processing system first analyzes the received image to identify content in the image's foreground and background portions, and to adaptively generate a trimap for the image based on differences between the identified foreground and background content. By identifying content of the image prior to generating the trimap, the techniques described herein can be applied to a wide range of images, such as images where foreground content is visually similar to background content, and vice versa. This automatically generated trimap can then be applied to output one or more selected objects in the image, with the digital image and the low-resolution image segmentation as the only inputs provided to the image processing system. Thus, the described digital medium environment increases computational efficiency of a computing device that performs the described image segmentation techniques, and increases user efficiency in interacting with the computing device that incorporates these techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
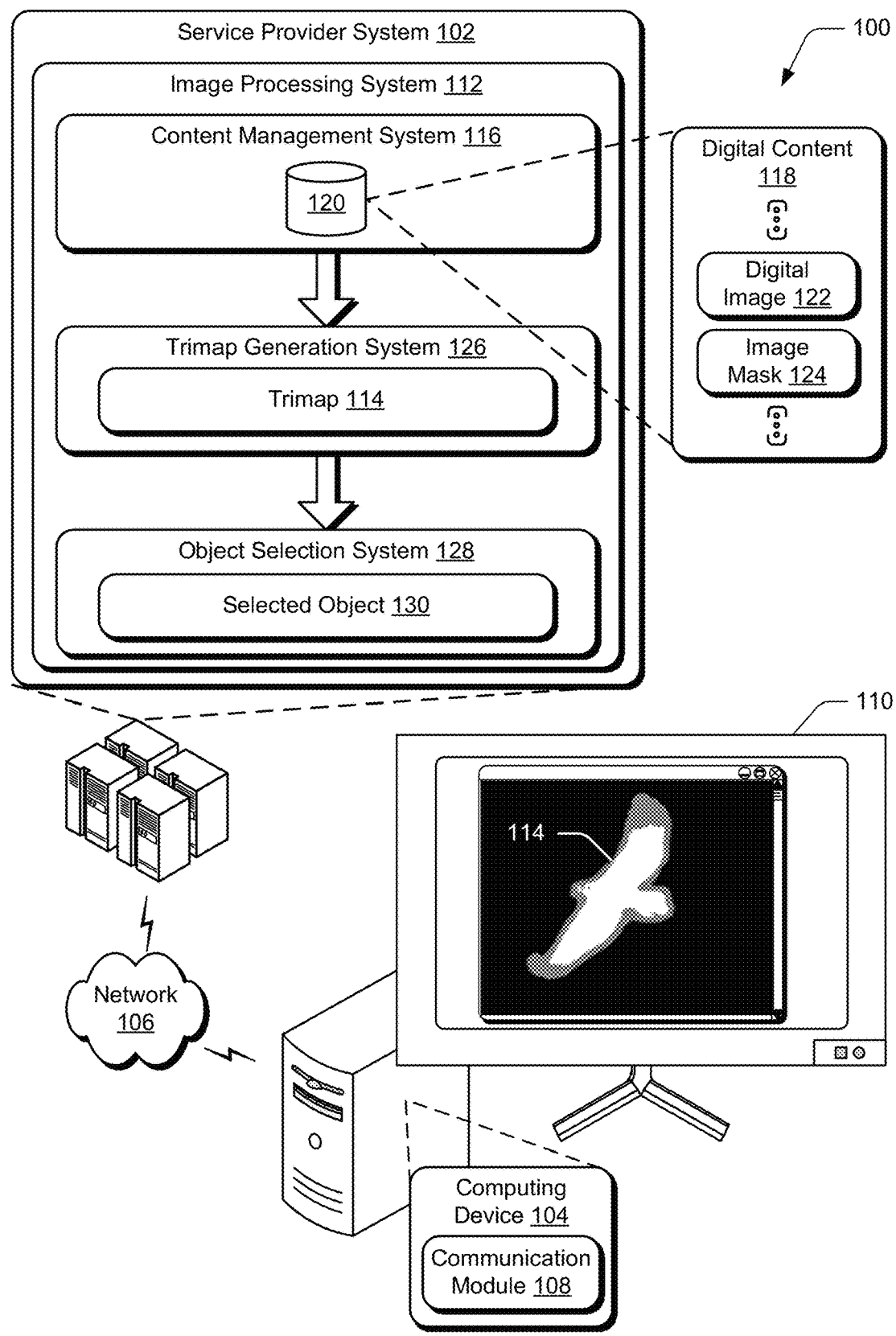
FIG. 1 is an illustration of an environment in an example implementation that is operable to employ automatic trimap generation and image segmentation techniques described herein.

Techniques and systems are described herein that overcome the challenges of conventional techniques for segmenting a foreground from a background of a digital image. The described systems and techniques are applicable to a wide range of different digital images, regardless of content included in the image. These techniques and systems support increased computational efficiency of a computing device that performs the image segmentation, as well as increased user efficiency in interacting with the computing device that incorporates these techniques. To overcome the limitations of conventional approaches, the systems and techniques described herein determine differences between foreground and background content of the image to generate a trimap for the image and apply the trimap to the image to select foreground or background content, automatically and without user input or intervention.

For example, a digital image and an image mask for the digital image are received at a computing device. In accordance with one or more implementations, the image mask is generated for the digital image using deep learning (e.g., a convolutional neural network), and includes a value associated with each pixel in the image mask describing a probability that the pixel corresponds to a foreground of the digital image. Due to the computational resource limitations of neural networks and other deep learning techniques, the image mask is of a lower resolution than the digital image. In this manner, the image mask represents a rough segmentation of foreground and background portions for a digital image, i.e., such as if the image were downsampled to a lower resolution.

Upon receiving the digital image and the image mask for the digital image, the image processing system described herein upsamples the image mask to a resolution of the digital image. Upsampling may be performed using any of a variety of techniques, such as bicubic interpolation, bilinear interpolation, stepwise resolution increases, combinations thereof, and so forth. In this manner, the upsampled image mask includes a matching number of pixels to that of the digital image, i.e., such that there is a one-to-one correspondence between pixels of the digital image and pixels of the image mask.

After the image mask has been upsampled to a resolution of the digital image, the digital image is analyzed to differentiate between foreground and background pixels. This difference between foreground and background pixels is quantified based on respective differences between color spaces of the digital image's foreground and background. To do so, the image processing system sets a threshold pixel value to initially differentiate between foreground and background pixels. As an example, a threshold pixel value may be specified, where pixels in the digital image having values that satisfy the threshold pixel value are classified as foreground pixels and other pixels are classified as background pixels, or vice versa. Because threshold values alone cannot be reliably applied to a wide range of different image types, the image processing system further analyzes the digital image to compare foreground content with background content.

Image content comparison may be performed in a variety of different manners, such as through color histogram comparison, where histogram bins representing different divisions of color space are defined for both the foreground and background portions of the image mask. Using pixel values from the digital image, pixels of the upsampled image mask are separated into the defined histogram bins and a histogram distance is computed to quantify differences or similarities between the color spaces of the foreground and background portions. For example, when a large histogram distance is generated for an image, the image is likely to have a visually distinct difference between pixels belonging to the foreground and pixels belonging to the background, such as distinct colors for the foreground and background, little to no overlap between the foreground and the background, and so forth. In contrast, a small histogram distance is generally representative of an image where there is no clear visual difference between foreground and background pixels, such as digital images where the foreground and background are substantially the same color.

Given the computed histogram distance for a digital image, the techniques described herein implement a trained trimap settings model to determine trimap threshold settings for use in automatically generating a trimap for the digital image. The trained trimap settings model is trained on an image training set, where a histogram distance for each image in the training set is determined, and trimap threshold settings are tuned to find the optimal threshold values for the particular training image. Thus, given a calculated histogram distance, the trained trimap settings model can be leveraged to determine trimap threshold settings for a digital image without requiring any user input to assist in generating the trimap.

Using the trimap settings generated by the trained trimap settings model, the techniques described herein automatically generate a trimap for the digital image, where the trimap specifies pixels that definitely belong to the foreground of the digital image, pixels that definitely belong to the background of the digital image, and unknown pixels that may belong to either the foreground or background of the digital image. This automatically generated trimap may be post-processed to disambiguate the unknown pixels by classifying each of the unknown pixels as either a foreground pixel or a background pixel. Once the unknown pixels have been post-processed, each pixel of the image is defined as either belonging to the foreground or background of the digital image, and the pixels defining the foreground or background can be output as a selected object for further processing the digital image. Thus, the image processing system described herein increases computational efficiency of a computing device that performs the described image segmentation techniques, and increases user efficiency in interacting with the computing device that incorporates these techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Terms

The term "trimap" refers to a segmented image that includes three distinct regions: a foreground region, a background region, and an unknown region. As described herein, a trimap is generated for a digital image, such that the three distinct regions of the trimap correspond to content displayed by the digital image. Trimap pixels in the foreground region correspond to pixels in the digital image that definitely display content of interest to be selected. By contrast, trimap pixels in the background region correspond to pixels in the digital image that definitely display content that is not the content of interest to be selected. Trimap pixels in the unknown region correspond to pixels that may either display or not display the content of interest to be selected.

The term "image mask" refers to a probability map for a digital image that includes information describing a probability that each pixel of the digital image corresponds to content of interest to be selected. In an example where the content of interest to be selected in an image is the image's foreground, the image mask includes a plurality of pixels that each have an associated value indicating a probability that the pixel is displaying the image's foreground.

The term "trimap settings" refers to one or more pixel values that can be used to define whether pixels of a digital image will be represented in a corresponding trimap as belonging to the foreground region, the background region, or the unknown region. Pixel values included in trimap settings for generating a trimap may indicate a threshold value for foreground pixels in the trimap and/or a threshold value for background pixels in the trimap. For example, trimap settings may include information defining a foreground threshold value, such that any pixel in an image mask for which a trimap is to be generated that satisfies the foreground threshold value is assigned to the foreground region of the trimap. Alternatively or additionally, trimap settings may include information defining a background threshold value, such that any pixel in the image mask that satisfies the background threshold value is assigned to the background region of the trimap. Any pixels in the image mask that do not satisfy either the foreground or background threshold values are assigned to the unknown region of the trimap, to be subsequently processed for assignment to one of the foreground or background regions.

Example Environment

FIG. 1 is an illustration of a digital medium environment 100 in an example implementation that is operable to employ automatic trimap generation and image segmentation techniques described herein. The illustrated environment 100 includes a service provider system 102 and a computing device 104 that are communicatively coupled, one to another, via a network 106. A variety of computing device configurations may be used to implement the service provider system 102 and/or computing device 104.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and as described in FIG. 10.

The computing device 104 is illustrated as including a communication module 108 that is configured to communicate and support interaction with the service provider system 102. The communication module 108, for instance, may be configured as a web browser, a network-enabled application, and so on to access an image processing system 112 via the network 106. Although functionality to implement an image processing system 112 usable to automatically generate a trimap 114 and a selected object 130 is described in the following as implemented by the service provider system 102, this functionality may be implemented partially or as a whole by the computing device 104, e.g., through local execution by a processing system and computer-readable storage media. The computing device 104 is also illustrated as including a user interface displayed at a display device 110 that supports user interaction, e.g., through use of a cursor control device, spoken utterances, touchscreen functionality, through use of a natural user interface, and so forth.

The image processing system 112 is further illustrated as including a content management system 116. The content management system 116 is representative of functionality to maintain, manage, and distribute digital content 118, which is illustrated as stored by a storage device 120. Digital content 118 may take a variety of forms, such as digital images 122 and image masks 124. Although illustrated included as part of the image processing system 112, this functionality may also be incorporated separately (e.g., remotely) from the system. Further, the content management system 116 may be representative of one of a plurality of different digital content sources that are usable to automatically generate a trimap for an image, and thus may also be implemented locally at the computing device 104.

The image processing system 112 also includes a trimap generation system 126 that is configured to automatically generate a trimap 114 using a digital image 122 and an image mask 124, independent of user input. The image processing system 112 further includes an object selection system 128 that is configured to automatically generate a selected object 130 using the trimap 114. Accordingly, given a digital image 122 and an image mask 124, the image processing system 112 may generate a trimap 114 that accounts for content in the digital image 122 and is useable to automatically select one or more objects in the digital image. In this manner, functionality of the image processing system 112 can be applied to a wide range of images, such as images where foreground content is visually similar to background content, and images where foreground content is visually distinct from background content.

In general, functionality, features, and concepts described in relation to the examples above and below may be employed in the context of the example procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
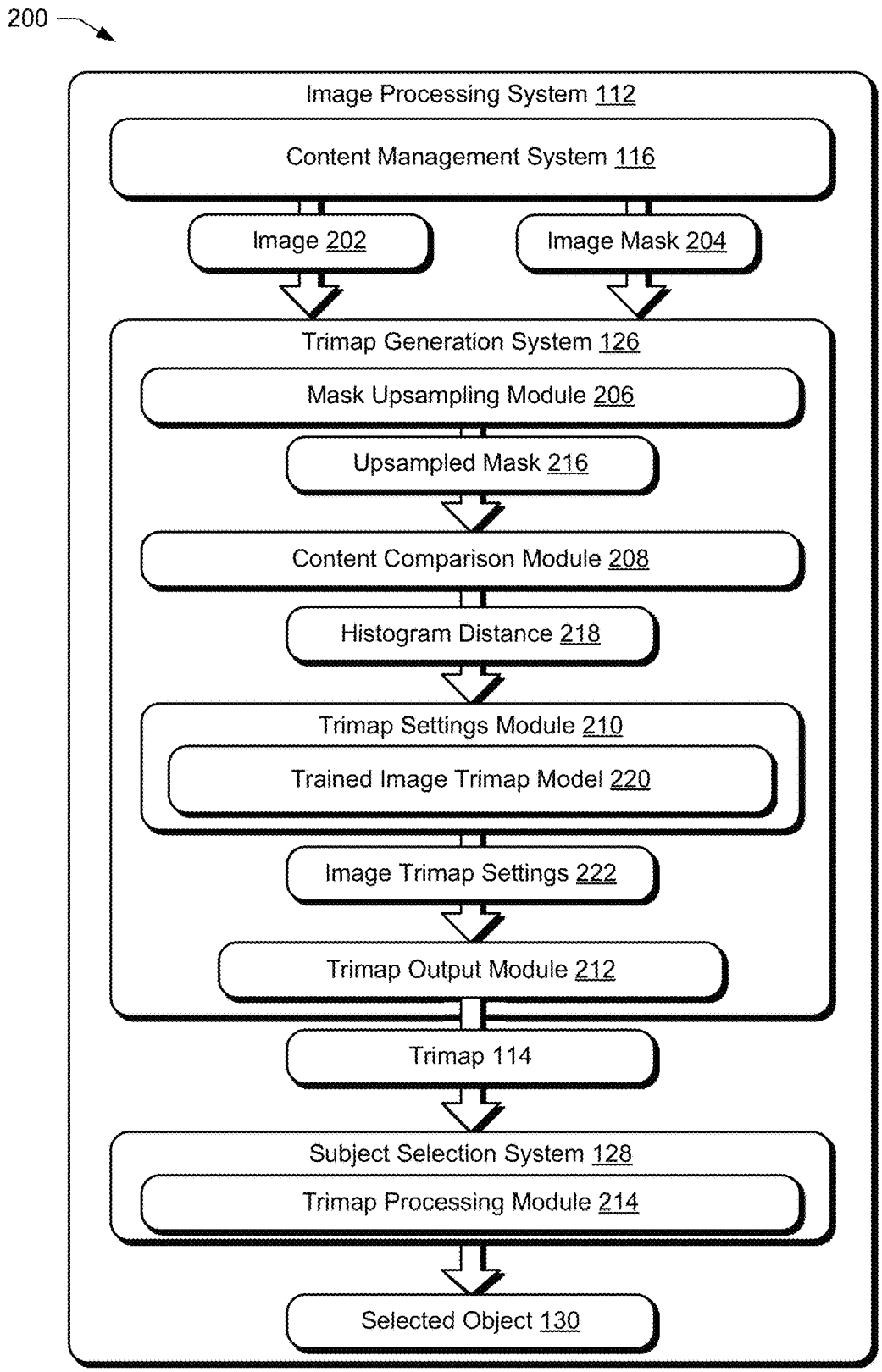
FIG. 2 depicts a system in an example implementation showing operation of an image processing system of FIG. 1 in greater detail as automatically generating a trimap for an image that is usable to select an object in the image.

FIG. 2 depicts a system 200 in an example implementation showing operation of the image processing system 112 of FIG. 1 in greater detail as automatically generating trimap for an image, given the image and an image mask for the image. The automatically generated trimap may then be used to output a selected object for the image, where the selected object represents one or more portions of the image, such as one or more foreground portions or one or more background portions of the image. As illustrated, the image processing system 112 provides an image 202 and an image mask 204 from the image from the content management system 116 to the trimap generation system 126. In accordance with one or more implementations, the content management system 116 generates the image mask 204 for the image 202 using a convolutional neural network. As described herein, the image 202 may be a high-resolution digital image, graphic, video, or other image assets. In some implementations, the content management system 116 is a subscription-based service that includes one or more databases of digital images, graphics, videos, templates, and the like.

The image mask 204 includes a plurality of pixels and represents a probability map for pixels of the image 202, where each pixel in the image mask 204 is associated with a value indicating a confidence that the pixel corresponds to a foreground of the image 202. For example, a pixel value of one indicates that the pixel in the image mask 204 corresponds to a pixel displaying foreground content in the image 202. Conversely, a pixel value of zero indicates that the pixel in the image mask 204 corresponds to a pixel displaying background content in the image 202. In accordance with one or more implementations, the image mask 204 is generated using a neural network, as described in further detail with respect to U.S. patent application Ser. Nos. 15/784,918 and 15/799,395, the disclosures of which are incorporated by reference. Thus, a pixel value of 0.7 for a pixel in the image mask 204 indicates that the neural network thinks the pixel has a 70% chance of belonging to a foreground of the image 202. Although described as ranging from zero to one, pixel values of an image mask can be scaled to any suitable range to indicate a confidence of the pixel belonging to the foreground of an image. For instance, in one or more implementations the pixel values can range from zero to 255 to fit an 8-bit data type.

Due to hardware computation and memory resource constraints, the image mask 204 generated by a neural network may be of a lower resolution than the image 202. For example, the image 202 may be a 7000×5000 pixels digital image, while the image mask 204 may be 256×256 pixels. Because the image mask 204 is of a lower resolution than the image 202, the image processing system first upsamples the image mask 204 to a resolution of the image 202, such that there is a one-to-one correspondence between pixels of the image 202 and pixels of the image mask 204. As described herein, the mask upsampling module 206 of the trimap generation system 126 upsamples the image mask 204 to generate the upsampled mask 216. Thus, the upsampled mask 216 is of a matching resolution and includes a number of pixels matching those of the image 202, where each pixel in the upsampled mask 216 includes a mathematically weighted value indicating a probability that the pixel corresponds to a foreground object in the image 202. Thus, the upsampled mask 216 represents an approximation of an image mask 204 that would have been generated by the neural network at a resolution of the image 202, given unlimited time and computational resources. The mask upsampling module 206 is configured to generate the upsampled mask 216 from the image mask 204 using any suitable technique, such as linear interpolation, bicubic interpolation, stepwise upsampling, combinations thereof, and so forth.

Figure 3:
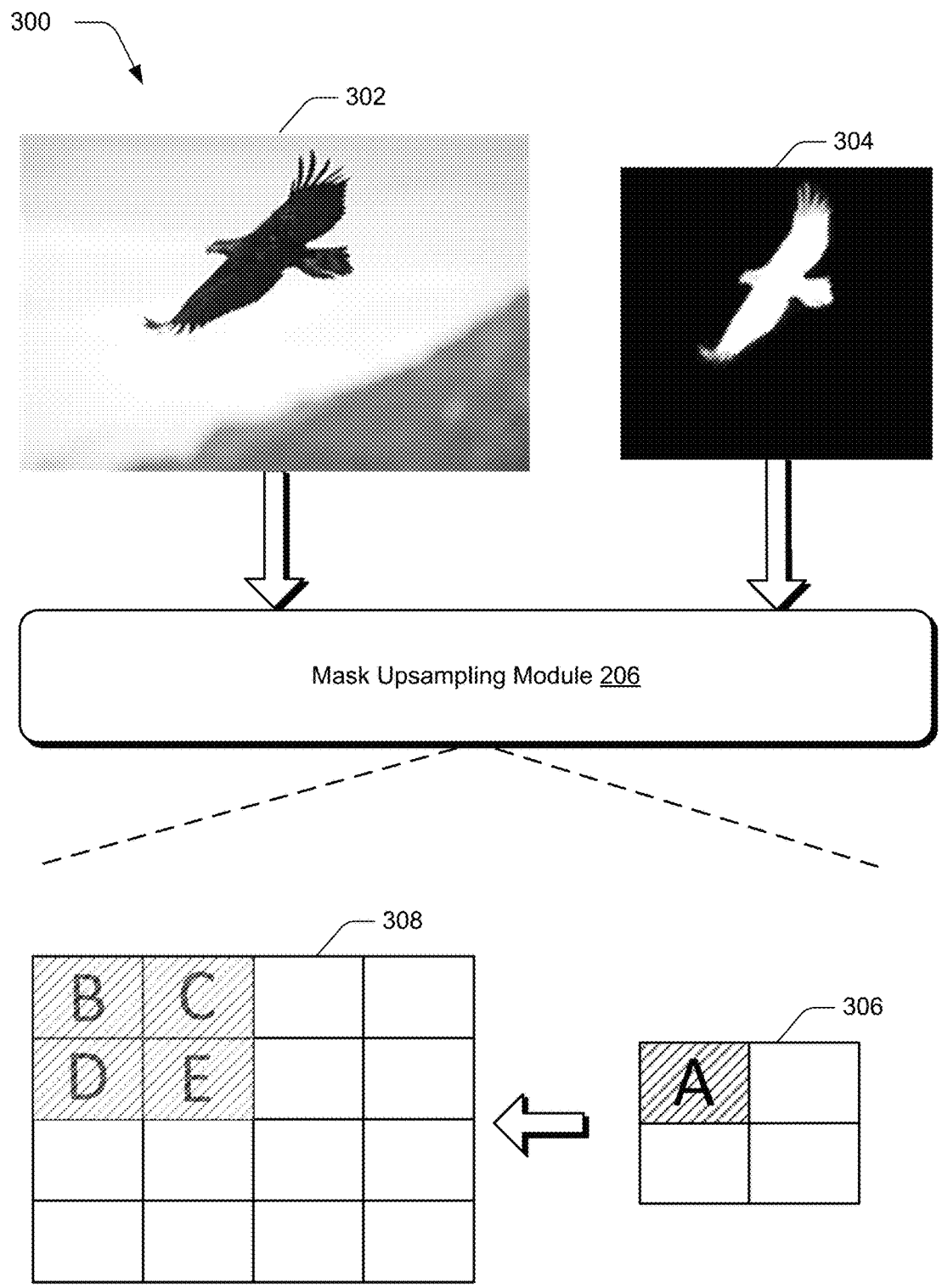
FIG. 3 depicts an example implementation of upsampling an image mask for an image to a resolution of the image.

FIG. 3 depicts an example implementation 300 of the mask upsampling module 206 upsampling an image mask to generate an upsampled mask using the techniques described herein. In the illustrated example, the mask upsampling module 206 receives an image 302 and an image mask 304. The image 302 depicts a high-resolution image of a soaring eagle, contrasted against the sky, with terrain in the lower right corner of the image 302. The image mask 304 is of a lower-resolution than the image 302, and may be generated automatically by a neural network. In the illustrated example, the image mask 304 represents a grayscale probability map of individual pixels corresponding to a foreground object of the image 302 (e.g., the eagle). Darker shaded pixels of the image mask 304 are those considered to be likely pertaining to the background of the image 302, while lighter shaded pixels of the image mask 304 are those considered by the neural network to be likely pertaining to the foreground of the image 302. Gray pixels, such as those of the image mask 304 including a display of an edge of the eagle, are pixels that may correspond to either the foreground or background of the image 302.

A difference in resolution between the full-resolution image 302 and the image mask 304 is illustrated by image mask 306 and upsampled image mask 308, where bounded boxes of each mask correspond to an individual pixel. In the illustrated example, the image mask 306 is representative of the image mask 304, and includes only four pixels. By contrast, the upsampled image mask 308 is representative of the upsampled mask 216 of FIG. 2, includes 16 pixels, and is generated by the mask upsampling module 206 to have a resolution matching that of the image 302.

Because upsampling the image mask 304 involves creating pixels, the mask upsampling module 208 performs interpolation to estimate the values of created pixels from one or more pixels of the low resolution image mask 304. For example, mask upsampling module 206 is illustrated as interpolating a pixel value of pixel "A" in image mask 306 to pixels "B", "C", "D", and "E" of the upsampled image mask 308. Thus, the mask upsampling module 206 approximates pixel values for the probability map that would have otherwise been generated by the neural network if the neural network was capable of outputting an image mask 304 having a same resolution as the image 302. This interpolation may be performed using any suitable method, such as bilinear interpolation, bicubic interpolation, stepwise interpolation, and so forth. Additionally, although only illustrated as including four and sixteen pixels, respectively, the mask upsampling module 206 is configured to implement the techniques described herein to upsample image mask 304 from any resolution to a resolution of the image 302, and may generate individual pixels of an upsampled mask 216 using values of any one or more pixels from the image mask 204.

Returning to FIG. 2, the trimap generation system 126 provides the image 202 and the upsampled mask 216 to the content comparison module 208. The content comparison module 208 is configured to analyze the image 202 for content color information and determine a distance between a color space of the foreground of the image 202 and a color space of the background of the image 202. In an implementation where an object is to be selected from the image 202, the content comparison module 208 may classify the object as a foreground portion of the image. To do so, the content comparison module 208 assigns preliminary pixel threshold values for differentiating between foreground and background pixels.

For example, in an implementation where the upsampled mask 216 is a 256×256 pixel grayscale probability map, pixel values may range from zero to 255, inclusive, with zero indicating that the pixel is definitely a background pixel and 255 indicating that the pixel is definitely a foreground pixel. The content comparison module 208 may then assign preliminary pixel threshold values to differentiate between foreground and background pixels. For example, the content comparison module 208 may specify a foreground pixel threshold as being 136. Any pixel whose value satisfies this foreground pixel threshold (e.g., is greater than 136 or is greater than or equal to 136) is preliminarily designated as a foreground pixel by the content comparison module 208 for the purpose of color space analysis. Similarly, the content comparison module 208 may specify a background pixel threshold as being 110. Any pixel whose value satisfies this background pixel threshold (e.g., is less than 110 or is less than or equal to 110) is designated as a background pixel by the content comparison module 208 for the purpose of color space analysis. Continuing this example, any pixel whose value does not satisfy either the background or foreground pixel thresholds is designated as an unknown pixel. In some implementations, the preliminary pixel threshold value is a single value, where any pixels whose value satisfies the threshold is designated as a foreground pixel and all other pixels are designated as background pixels.

These example foreground and background pixel threshold values are not intended to be limiting, and the content comparison module 208 may specify any suitable value for the preliminary foreground and background pixel threshold values. In some implementations, the foreground and background pixel threshold values may be pre-specified by a developer of the trimap generation system 126. Alternatively or additionally, the content comparison module 208 may analyze the upsampled mask 216 to determine average pixel values and select the preliminary foreground and background pixel threshold values based on the analysis. In accordance with one or more implementations, the preliminary foreground and background pixel threshold values may be further refined by other image processing techniques, such as dilation, erosion, etc. However, these preliminary foreground and background pixel threshold values cannot be reliably used as a basis to generate an accurate trimap. Because trimap accuracy is crucial for post processing to accurately select an object from the image 202, the content comparison module 208 proceeds to analyze the image 202 for color information collection so that the trimap generation system 126 can automatically generate a content-aware trimap 114.

Once preliminary pixel threshold values have been assigned for the purpose of designating foreground and background portions of the image 202, the content comparison module 208 compares foreground and background content of the image 202. In one or more implementations, this image content comparison is performed by separating pixels designated as being foreground pixels into foreground color histogram bins and separating pixels designated as being background pixels into background color histogram bins, using color information from the image 202. These bins are then used to calculate a histogram distance 218, representing a distance in color space between foreground content and background content of the image 202.

A large histogram distance is generally representative of an image having visually distinct foreground and background pixels, such as an image where a foreground object has straight defined edges, where the foreground and background portions are starkly contrasted colors, when there is no overlap between foreground and background content, and so forth. Conversely, a small histogram distance is generally representative of an image having no clear visual difference between foreground pixels and background pixels, such as an image where a foreground object has curved edges with large bend radii, where foreground and background portions are substantially the same color, where there is overlap between foreground and background pixels, and so forth.

Figure 4:
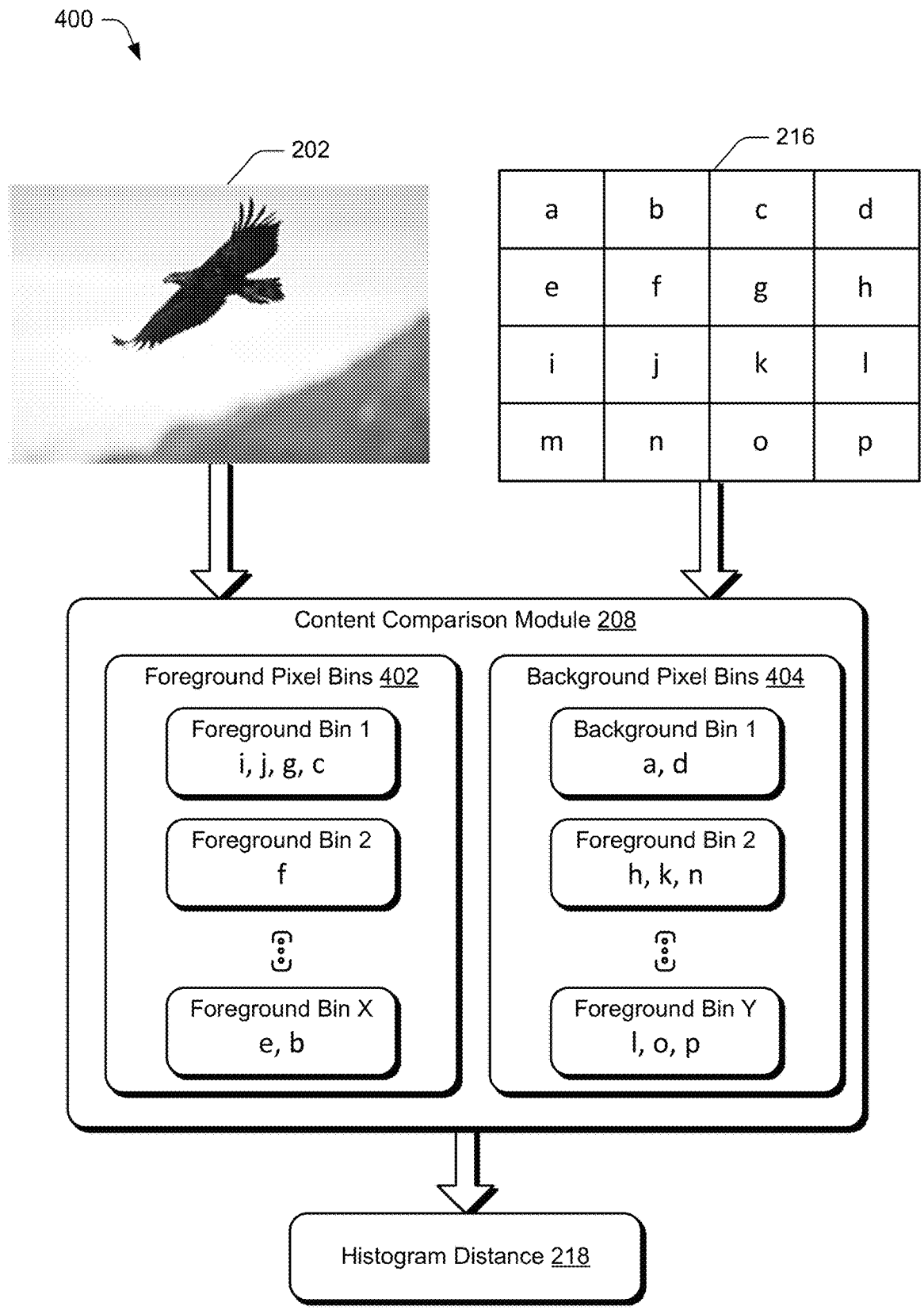
FIG. 4 depicts an example implementation of generating a histogram distance describing differences between a foreground and background of an image by classifying pixels of an upsampled image mask for the image using color values from pixels of the image.

FIG. 4 depicts an example implementation 400 of the content comparison module 208 generating a histogram distance 218 between foreground and background content of the image 202, using the upsampled mask 216 generated by the content comparison module 208. In the illustrated example, the upsampled mask 216 is generated to include pixels a, b, p, which are each associated with a value indicating a probability that the pixel corresponds to a pixel in the digital image 202 including a display of a foreground object (e.g., the eagle).

The content comparison module 208 generates a number of foreground pixel bins 402 and a number of background pixel bins 404. The content comparison module 208 may generate any number of foreground pixel bins 402 and any number of background pixel bins 404, and may generate a different number of foreground and background pixel bins 402, 404. For instance, the content comparison module 208 may generate six foreground bins 402 and six background bins 404. Each bin is representative of a division of color space, such as RGB, HSV, and so forth. Thus, each of foreground bin 1, foreground bin 2 . . . foreground bin X represent a different interval of a color space, such that pixels designated as foreground by the preliminary threshold values can be assigned to one of the foreground pixel bins 402. Likewise, each of background bin 1, background bin 2, and background bin Y represent a different interval of the color space, such that pixels designated as background by the preliminary threshold values can be assigned to one of the background pixel bins 404.

Based on the preliminary threshold classification of pixels as belonging to either foreground or background portions of the image 202, the content comparison module 208 separates the pixels of the up sampled mask 216 one of the foreground pixel bins 402 or the background pixel bins 404. In the illustrated example, pixels b, c, e, f, g, i, and j of the upsampled mask 216 are classified as foreground pixels, and have been separated into the foreground pixel bins 402 based on color values of corresponding pixels in the image 202. For instance, upon comparing the foreground pixels with corresponding pixel color values in the image 202, the content comparison module 208 identified that pixels c, g, i, and j are associated with color values encompassed by foreground bin 1, that pixel f is associated with a color value encompassed by foreground bin 2, and that pixels b and e are associated with color values encompassed by foreground bin X.

In the illustrated example, pixels a, d, h, k, l, n, o, and p are classified as background pixels, based on the preliminary pixel threshold values, and have been separated into the background pixel bins 404 based on color values of corresponding pixels in the image 202. For instance, pixels a and d are associated with color values encompassed by background bin 1, pixels h, k, and n are associated with color values encompassed by background bin 2, and pixels l, o, and p are associated with color values encompassed by background bin Y.

Using these foreground pixel bins 402 and background pixel bins 404, the content comparison module 208 computes the histogram distance 218. Computing the histogram distance can be performed using a variety of different measurements, such as the Bhattacharyya distance represented in Equation 1:

$$d(H_1, H_2) = \sqrt{1 - \frac{1}{\sqrt{\overline{H_1}\overline{H_2}N^2}} \sum \sqrt{H_1 \cdot H_2}} \qquad (Eq. 1)$$

In equation 1, $H_1$ represents the foreground histogram, $H_2$ represents the background histogram, and N represents the number of bins in each of the foreground pixel bins 402 and the background pixel bins 404. Thus, the content comparison module is configured to generate the histogram distance 218 as $d(H_1, H_2)$, which is then useable to generate trimap settings for the image 202 that account for content included in the foreground and background portions of the image. Although described herein as being computed using the Bhattacharyya distance, any suitable approach may be used for computing distances between color distributions, such as Euclidean distance, KL-Divergence, Chi-Square distance, histogram intersection distance, Earth-Movers-Distance, and so forth. Further, the color histograms can be computed in any suitable color space, such as RGB, YCbCr, Lab, and the like.

Figure 5:
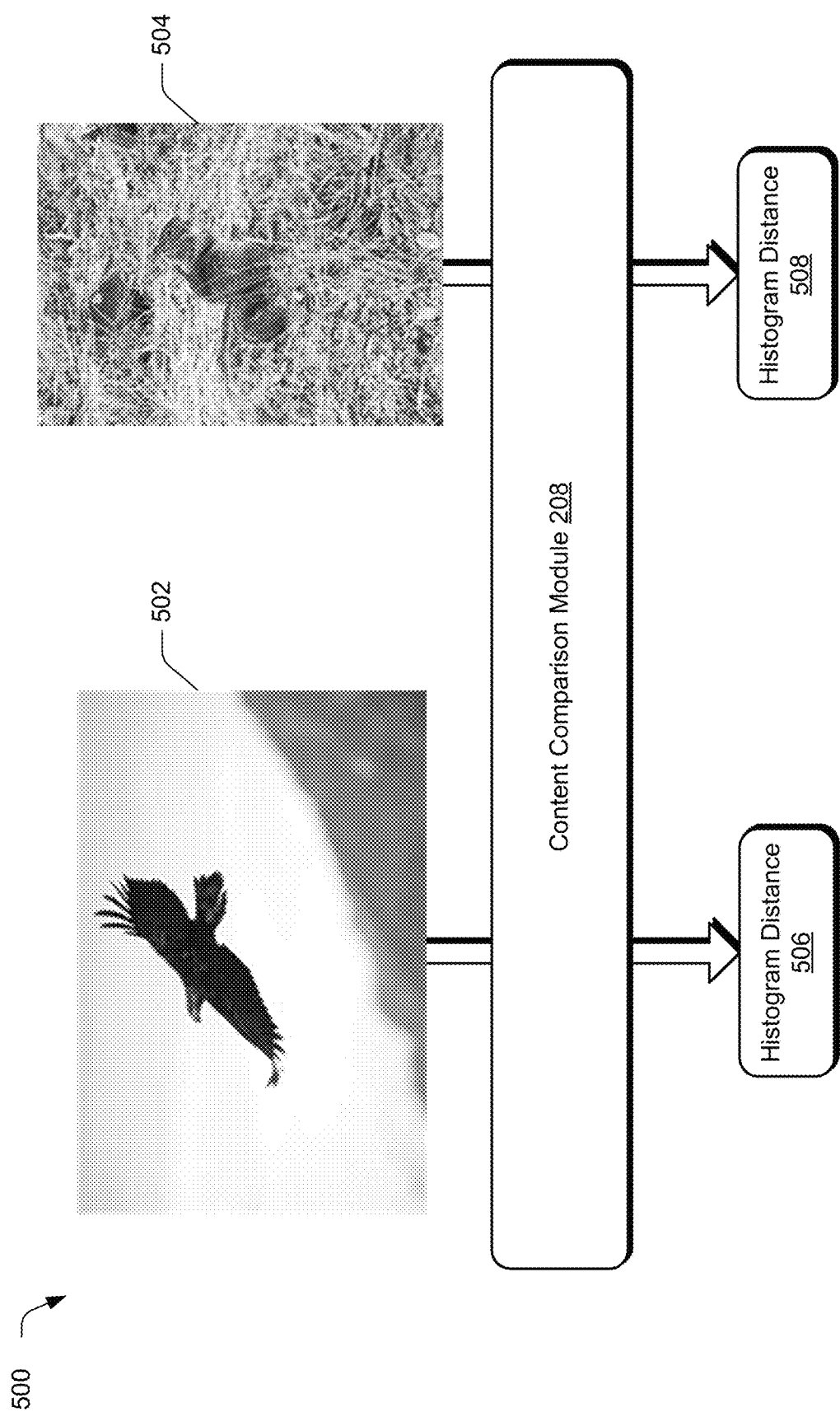
FIG. 5 depicts an example implementation of generating different histogram distances for different images.

As illustrated in FIG. 5, different histogram distances will be generated for different images, based on a relationship between color spaces of foreground and background content in an image. FIG. 5 depicts an example implementation 500 of the content comparison module 208 generating histogram distances for digital images using the techniques described herein. In the illustrated example, content comparison module 208 receives two different images 502 and 504, along with upsampled masks for each of the images, such as upsampled mask 216 illustrated in FIG. 2. Image 502 is representative of an image with visually distinct foreground and background content. By contrast, image 504 is representative of an image having visually similar foreground and background content. For example, image 504 depicts a squirrel surrounded by vegetation having substantially the same color as the squirrel, with portions of the vegetation visually occluding portions of the squirrel. Thus, even though the squirrel is not closer to a camera that was used to capture image 504 than all other portions of the image 504, the squirrel can still be designated as the foreground object to be selected using the techniques described herein. Based on the visual distinction between foreground and background portions of image 502, the histogram distance 506 will be larger than the histogram distance 508, generated from image 504 having visually similar foreground and background content. Accordingly, content comparison module 208 is configured to generate respective histogram distances 506 and 508 for the images 502 and 504 in a manner that is content-aware, without requiring user input or intervention.

Returning to FIG. 2, the trimap settings module 210 is configured to generate image trimap settings 222 for the image 202 by applying the histogram distance 218 to a trained image trimap model 220. Functionality of the trimap settings module 210 and the trained image trimap model 220 is described in further detail below with respect to FIG. 6.

Figure 6:
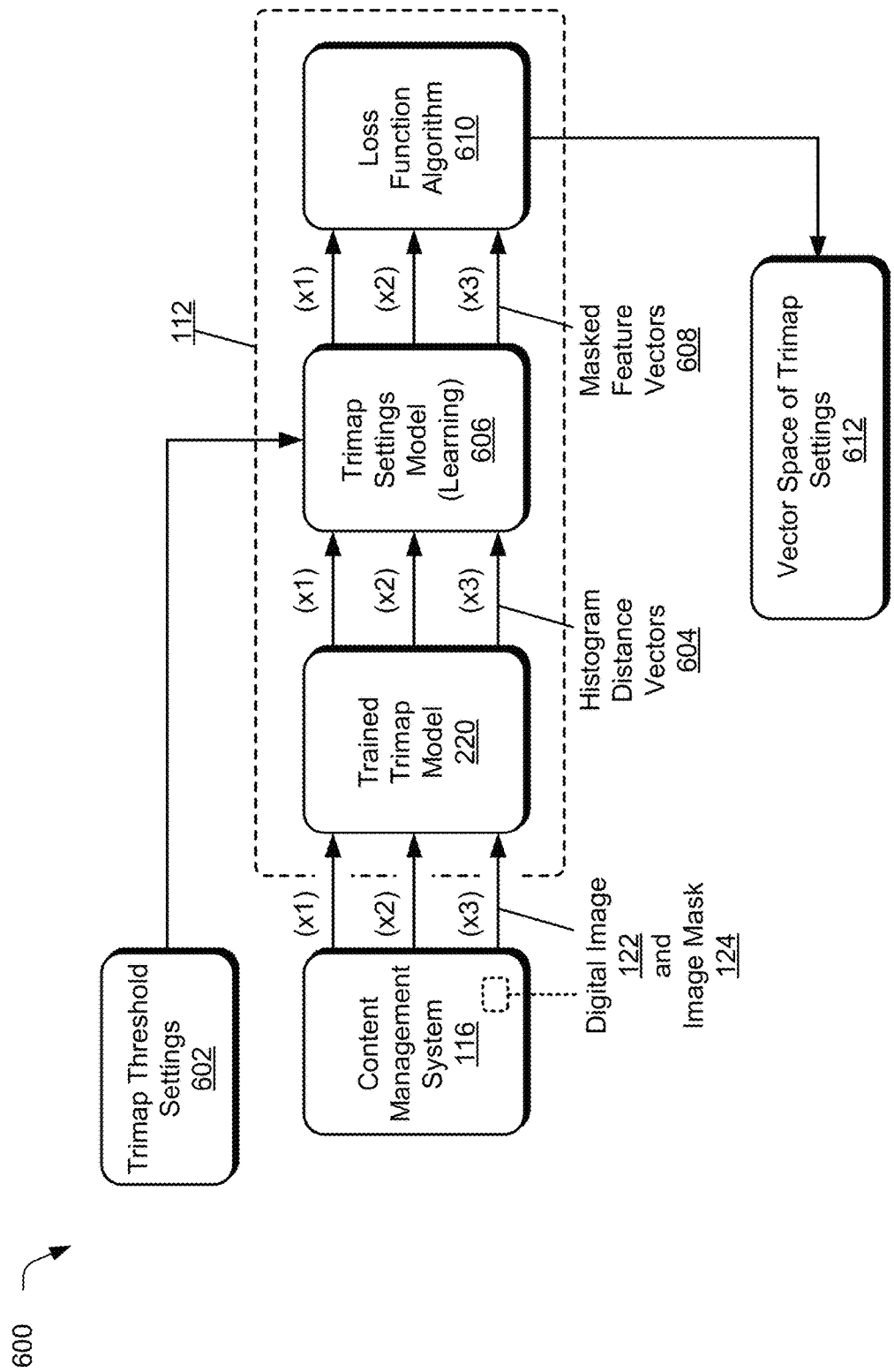
FIG. 6 is an illustration of an example implementation that is operable to automatically generate a trimap using the techniques described herein.

FIG. 6 illustrates an example implementation 600 of features of the image processing system 112 in which aspects of automatic trimap generation and image segmentation for an image can be implemented. The examiner implementation 600 includes the image processing system 112, which may be implemented as a cloud-based service system as illustrated and described with reference to FIG. 10. Generally, the cloud-based service system described herein is an image processing service that can be accessed via the Internet, and includes the content management system 116, which stores the digital images 122 and the image masks 124. As described herein, the digital images 122 stored by the content management system 116 may include any number of high-resolution digital images, graphics, videos, and other image assets. In some implementations, the content management system 116 is a subscription-based service that includes one or more databases of digital images, graphics, videos, templates, and the like.

In the example implementation 600, the image processing system 112 learns a basis for determining trimap settings for each of the digital images 122 and their associated image mask 124 based on trimap threshold settings 602. Generally, the image processing system 112 is designed to analyze an image for content included in the image and determine trimap settings for segmenting the image based on the analysis. More specifically, the image processing system 112 determines a distance between the color spaces of a foreground and a background of one of the digital images 122, determines trimap settings for the image using the trained trimap model 220 (e.g., a pre-trained image processing model), and automatically generates a trimap for the image without requiring any user input to specify trimap settings, confirm trimap settings, adjust trimap settings, and so forth.

In the example implementation 600, the image processing system 112 includes the trained trimap model 220, the trimap settings model 606 (e.g., in a learning mode), and a loss function algorithm 610. In accordance with one or more implementations, the trained trimap model 220 (also referred to as a pre-trained image trimap model) is a machine-learning model that is pre-trained for image segmentation, such as a convolutional neural network (e.g., a convNet system architecture), which can learn color space information for the digital images 122. Generally, a convolutional neural network is a type of machine-learning model implemented as a computing algorithm for self-learning with multiple layers that run logistic regression on data to learn features and train parameters of the network. The self-learning aspect is also referred to as unsupervised feature learning because the input is unknown to the convolutional neural network, in that the network is not explicitly trained to recognize or classify the image content, but rather trains and learns the image content from the input.

In the illustrated implementation 600, the trained trimap model 220 is a pre-trained convolutional neural network implemented in the image processing system 112, and generates image trimap settings for the digital images 122 based on a comparison of color information for foreground and background content of the digital images 122, represented as histogram distance vectors 604. Alternatively, the trained trimap model 220 may be implemented as any type of machine-learning model, including but not limited to, decision trees, support vector machines, linear regression, logistic regression, Bayesian networks, random forest learning, dimensionality reduction algorithms, boosting algorithms, neural networks (e.g., fully-connected neural networks, convolutional neural networks, or recurrent neural networks), deep learning networks, and so forth.

The digital images 122 and corresponding image masks 124 are each input from the content management system 116 to the trained trimap model 220, such as the three example digital image and image mask pairs, identified in the illustrated example as x1, x2, and x3. For the learning aspect of the image processing system 112, the trimap threshold settings 602 is a known condition, meaning that the trimap threshold settings in the learning mode are known, designated inputs to the image processing system 112, such as and one or more threshold pixel values defining how to classify individual pixels of the digital images 122 as a foreground pixel, a background pixel, or an unknown pixel. For example, in an implementation where one of the digital images 122's associated mask 124 is a grayscale image, individual pixel values may range from zero to 255, inclusive, with a pixel value of zero indicating that the pixel is definitely a background pixel and 255 indicating that the pixel is definitely a foreground pixel.

The trimap threshold settings 602 specify foreground and background pixel threshold values, such as a background threshold value of 110 and a foreground threshold of 136. In this example, pixels of the image mask 124 of the digital image 122 having a value of 110 or less are designated as background pixels, pixels having a value of 136 or greater are designated as foreground pixels, and pixels having a value between 110 and 136 are designated as unknown pixels. Thus, each of the digital images 122 in the content management system 116 are associated with designated trimap threshold values for segmenting the foreground portion from the background portion of the image, using pixel values of the associated image mask 124. The digital images and image mask pairs x1, x2, and x3 are input to the trained trimap model 220, which generates output of a histogram distance vector 604 for each one of the digital images x1, x2, and x3.

As described with herein, the histogram distance vector 604 for a digital image 122 is a vector representation of a distance between color spaces of the foreground and background portions of the digital image 122. For example, a small color space distance between foreground and background portions of the image indicates that the foreground and background appear visually similar, while a large color space distance indicates that the foreground and background portions of the image are visually distinct from one another. As noted above, the digital images 122 with their associated masks 124, represented by x1, x2, and x3, are each input to the trained trimap model 220 along with trimap threshold settings 602 describing how a trimap should be generated for an image, given a defined distance between color spaces of the image's foreground and background.

The masked feature vectors 608 for the digital image and image mask pairs x1, x2, and x3 are each a feature mask over top of the respective histogram distance vectors 604 that indicate the similarities or non-similarities between the digital images 122. For example, the masked feature vectors 608 may indicate that although the digital images of x1 and x3 have different histogram distance vectors 604, that similar trimap threshold settings are used to generate trimaps for the respective digital images of x1 and x3. Additionally or alternatively, the masked feature vector 608 may indicate that the digital images of x2 and x3 have different distances between foreground and background color spaces and different trimap threshold settings.

In accordance with one or more implementations, the trimap settings model 606 is implemented as a gradient descent type of model to determine the masked feature vectors 608 for each of the digital images 122 in the content management system 116. Generally, a gradient descent model can be implemented as an optimization algorithm designed to find the minimum of a function, and in this example implementation 600, optimizes for the loss function algorithm 610 of the image processing system 112. For instance, the gradient descent algorithm of the trimap settings model 606 minimizes a function to determine the masked feature vectors 608 that indicate similarities between digital images 122, particularly regarding color space distances between foreground and background portions of the digital image, and threshold settings for generating a trimap for the image. In some implementations, the trimap settings model 606 considers each possible combination pair of the digital images 122 by two images at a time.

For example, the trimap settings model 606 is applied to first run the images of x1 and x3 based on the trimap threshold settings 602 input for each of the two images, determines that they are similar for purposes of trimap threshold settings, and generate the masked feature vector 608. The trimap settings model 606 is then applied to run the images of x2 and x3 based on the trimap threshold settings 602 input for these two images, will determine that they are not similar for purposes of using trimap threshold settings, and update the generated masked feature vector 608. This process may be continued for any number of digital images 122 included in the content management system 116 to further update and refine the masked feature vector 608.

After the masked feature vectors 608 are determined by the trimap settings model 606, conditioned on the input trimap threshold settings 602, the loss function algorithm 610 is then applied to maximize the Euclidian distance between images indicated as having dissimilar trimap threshold settings and minimize the Euclidian distance between images indicated as having similar trimap threshold settings. In this manner, a user of the computing device 104 can upload a digital image for segmentation with its associated image mask, and the uploaded digital image can be applied to the trimap settings model 606 to determine the Euclidian distances between the uploaded digital image and every other digital image 122 in the content management system 116. To do so, the trimap settings model 606 generates a masked feature vector for the uploaded digital image based on a histogram distance vector 604 for the uploaded digital image, and compares the generated masked feature vector to all others of the masked feature vectors 608. The vector space of trimap settings 612, also referred to as the disentangled vector space, includes trimap settings for the uploaded digital image that are utilized by the image processing system 112 for automatically generating a trimap 114 and segmenting a foreground from a background of the uploaded digital image to generate a selected object 130.

Returning to FIG. 2, the trimap settings described in the vector space of trimap settings 612 of FIG. 6 are illustrated as the image trimap settings 222, provided by the trimap settings module 210 to the trimap output module 212. In accordance with one or more implementations, the image trimap settings 222 include threshold values suitable to define definite foreground, definite background, and unknown pixels of the image mask 204. Given these values, the trimap output module 212 identifies pixels in the image mask 204 having values that satisfy the foreground threshold value and generates the trimap 114 to include corresponding pixels indicated as foreground pixels. Similarly, the trimap output module 212 identifies pixels in the image mask 204 having values that satisfy the background threshold value and generates the trimap 114 to include corresponding pixels indicated as background pixels. Pixels in the trimap 114 that satisfy neither the foreground nor the background threshold values are indicated in the trimap 114 as unknown pixels, which can be further processed to disambiguate and assign the unknown pixels to either a foreground portion or background portion of the image 202, such as by subject selection system 128.

In this manner, the trimap generation system 126 is configured to automatically generate a trimap 114 for an image 202, given the image 202 and a low resolution image mask 204 for the image. Independent of receiving any user input or intervention to guide the trimap generation process, the image processing system 112 analyzes the image to make a content-aware decision regarding setting threshold values for differentiating between foreground and background pixels of the image 202.

The trimap generation system 126 is further configured to output the trimap 114 to the subject selection system 128 of the image processing system 112. The subject selection system 128 is illustrated as including a trimap processing module 214, which is representative of functionality implemented at least partially in hardware to assign unknown pixels of the trimap 114 to either a foreground portion or background portion of the image 202 by post-processing the trimap 114. In accordance with one or more implementations, the trimap processing module 214 is configured to perform dense Conditional Random Fields (CRFs), using the trimap 114 and the image 202 as inputs, to decide whether an unknown pixel is to be classified as a foreground pixel or a background pixel. After dense CRF has been performed, the subject selection system 128 identifies pixels of the image 202 identified by the trimap processing module 214 as corresponding to a foreground of the image 202 and outputs the foreground pixels as a selected object 130. Alternatively, the subject selection system 128 may identify pixels of the image 202 corresponding to a background of the image 202 and output the background pixels as the selected object 130. Although described herein with respect to dense CRFs, the trimap processing module 214 may assign unknown pixels of the trimap 114 to a foreground or background portion using any suitable technique, such as GraphCut-based optimization, region-growing processing, using partial differential equations, and so forth.

Figure 7:
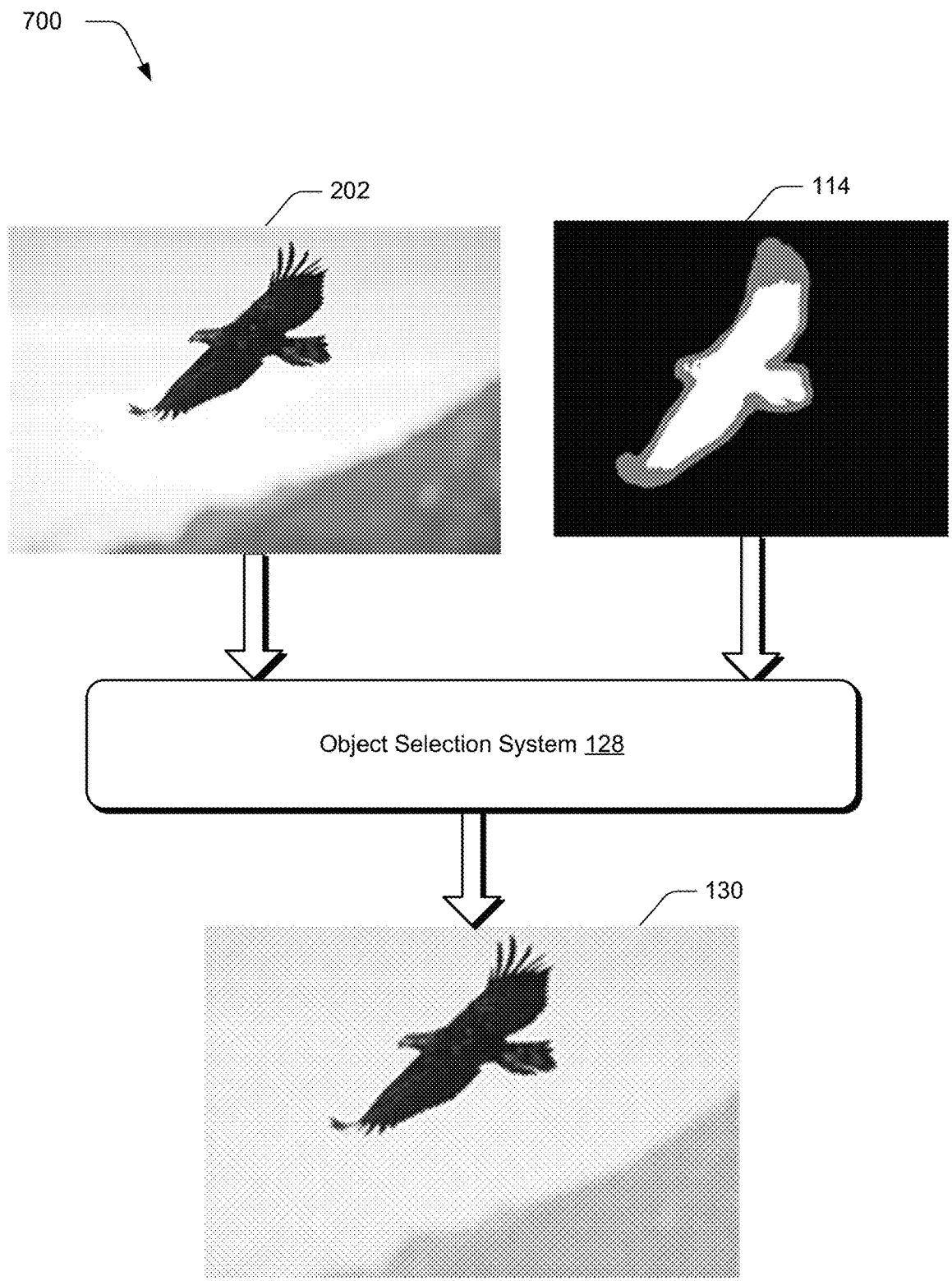
FIG. 7 depicts an example implementation of selecting an object in an image using an automatically generated trimap for the image.

FIG. 7 depicts an example implementation 700 showing the image 202 and the trimap 114 being input to the object selection system 128 to generate the selected object 130. In the illustrated example, the gray areas of the trimap 114 represent unknown pixels that were not classified as foreground or background pixels by applying the image trimap settings 222 to the image mask 204. The object selection system 128 processes the image 202 and the trimap 114 to disambiguate the unknown pixels and assign each unknown pixel as belonging to either the foreground or the background of the image 202. In the illustrated example, the foreground pixels including a display of the eagle in the image 202 and represented by the white pixels in the trimap 114 are output as the selected object 130. Thus, the systems and techniques described herein enable automatic generation of a trimap for an image, and automatic selection of an object from the image using the automatically generated trimap.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

Figure 8:
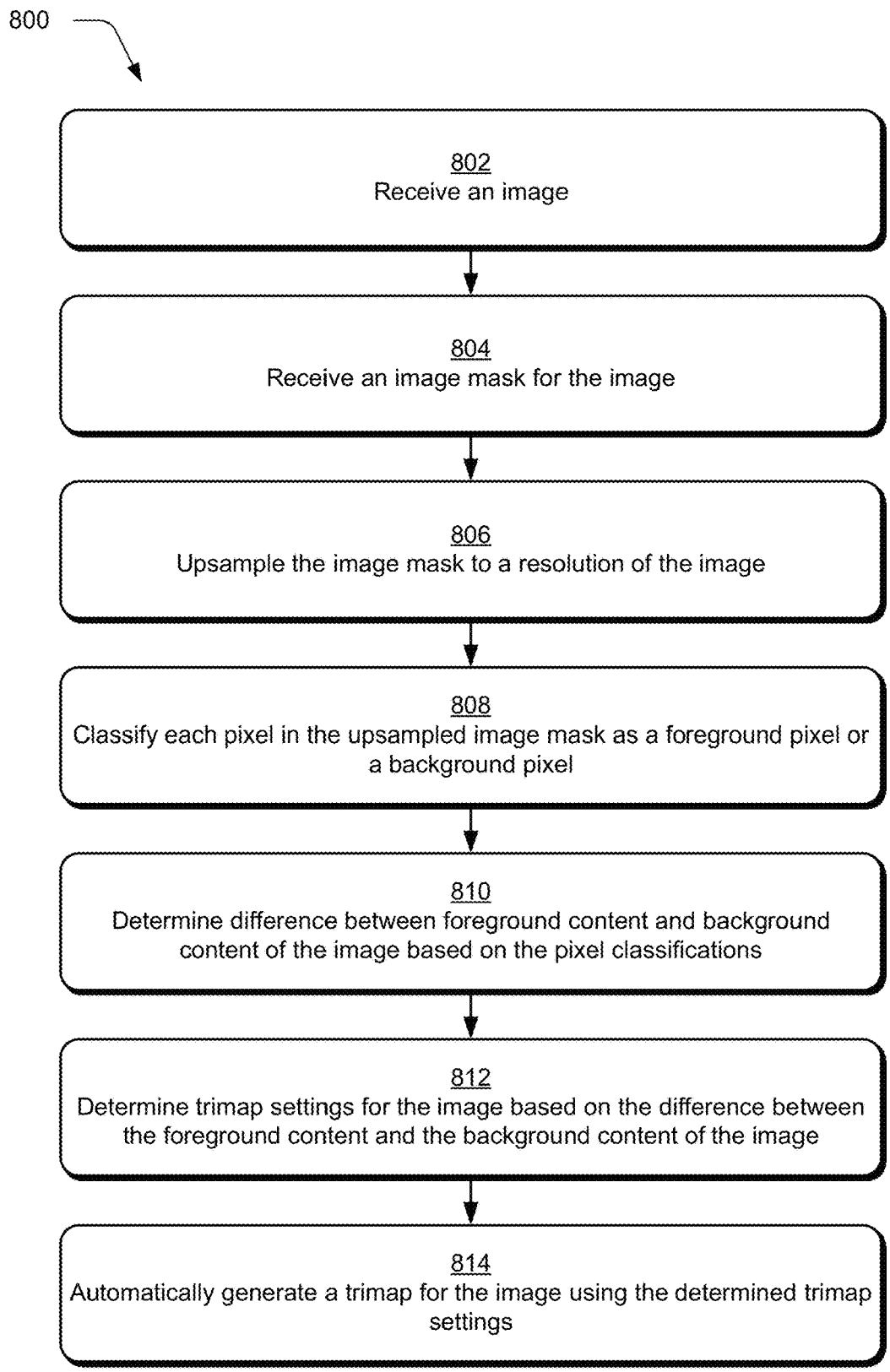
FIG. 8 is a flow diagram depicting a procedure in an example implementation for automatically generating a trimap for an image.

FIG. 8 depicts a procedure 800 in an example implantation of automatic trimap generation and object selection for an image. An image including foreground and background content is received (block 802). The computing device implementing the image processing system 112, for instance, receives an image 202 from a content management system 116. An image mask for the image is also received, which includes values assigned to each pixel indicating a probability that a corresponding pixel in the image includes a display of foreground content (block 804). In some implementations, the image mask is generated for the image by a neural network or other machine learning technique and is of a lower resolution than the image. As such, the image mask represents an automatically generated, rough approximation of whether pixels in the image should be regarded as foreground pixels or background pixels. For instance, the computing device implementing the image processing system 112 receives an image mask 204 from a content management system 116.

In response to receiving the image and the image mask, the image mask is upsampled to a resolution of the image (block 806). For instance, the mask upsampling module 206 of the trimap generation system 126 may apply bilinear interpolation, bicubic interpolation, stepwise interpolation, and the like to generate an upsampled mask 216 having a same resolution as the image 202. Data included in the upsampled mask 216 is interpolated based on the pixel value information included in the image mask 204. Thus, thus the upsampled mask 216 provides a probability, for each pixel of the image 202, that the pixel includes a display of foreground content in the image 202.

Each pixel in the upsampled mask is classified as either a foreground pixel or a background pixel (block 808). The content comparison module 208 of the trimap generation system 126, for instance, designates a preliminary pixel threshold value and classifies pixels in the upsampled mask 216 that satisfy the preliminary pixel threshold value as foreground pixels. Similarly, the content comparison module 208 classifies pixels in the upsampled mask 216 that do not satisfy the preliminary pixel threshold value as background pixels.

Differences between foreground content and background content of the image are determined based on the pixel classifications (block 810). The content comparison module 208, for instance, determines a distance between color spaces of the foreground portion(s) of the image and the background portion(s) of the image, as described in further detail with respect to FIG. 9. For instance, the difference between foreground content and background content may be quantified as a difference in color space values, represented by the histogram distance 218 generated by the content comparison module 208.

Trimap settings for the image are then determined based on the difference between the foreground content and background content of the image (block 812). The trimap settings module 210, for instance, applies a trained image trimap model 220 to the histogram distance 218 to determine trimap settings for the image by leveraging a corpus of images with known histogram (color space) distances between foreground and background portions, and known trimap settings tuned for each respective image. In this manner, the trimap settings module 210 utilizes the trained image trimap model 220 as a regression model to map color space distances to trimap threshold settings in a manner that is aware of the image's content and accurately distinguishes between foreground and background image content.

Using the determined trimap settings for the image, a trimap for the image is automatically generated independent of user intervention (block 814). The trimap output module 212 of the trimap generation system 126, for instance, identifies pixels of the image 202 that satisfy a foreground threshold value in the image trimap settings 222 and generates trimap 114 to include those pixels as foreground pixels. Similarly, the trimap output module 212 identifies pixels of the image 202 that satisfy a background threshold value in the image trimap settings and generates the trimap 114 to include those pixels as background pixels. Pixels in the image 202 that do not satisfy either the background threshold value or foreground threshold value in the image trimap settings 222 are designated as unknown pixels in the trimap 114, such that the automatically generated trimap 114 indicates foreground, background, and unknown regions of the image 202.

Figure 9:
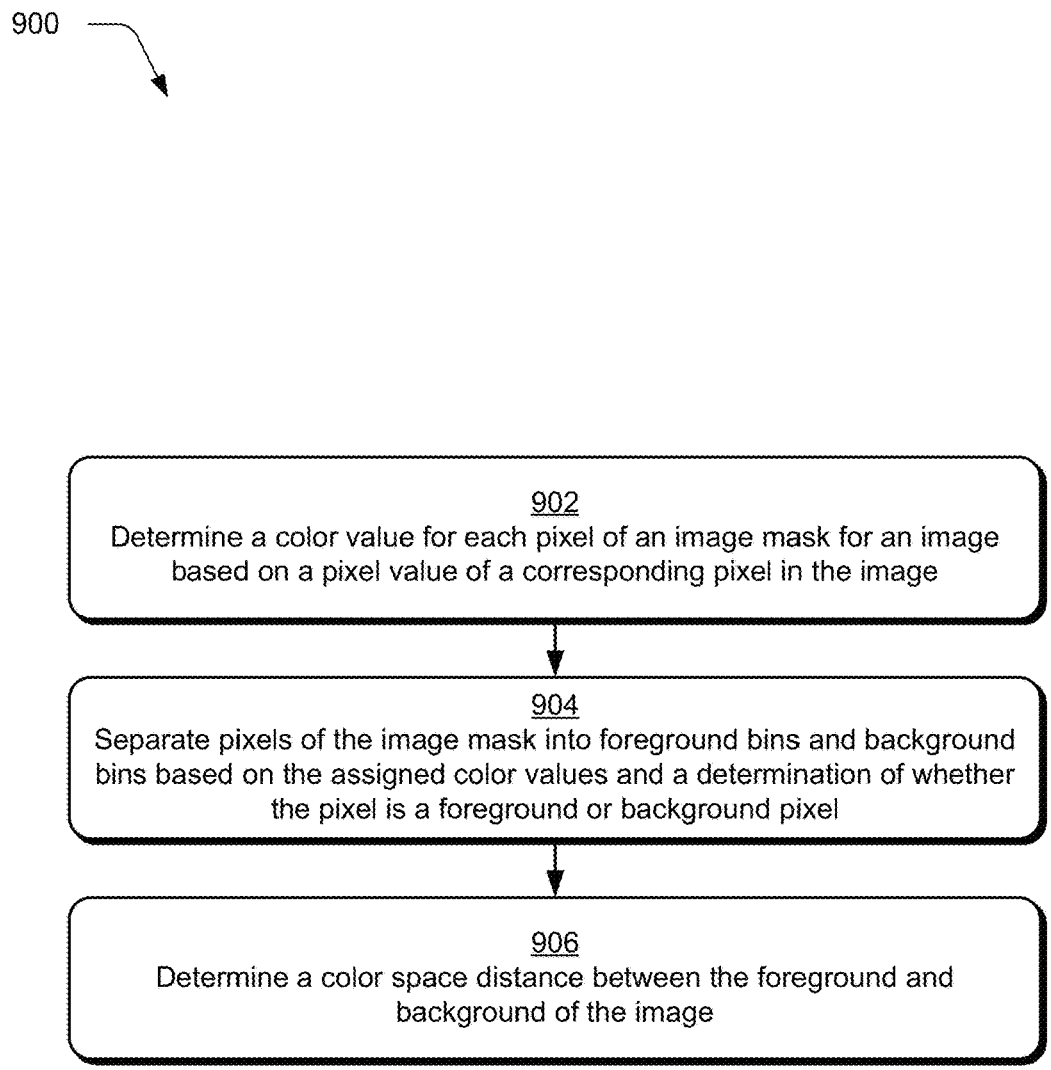
FIG. 9 is a flow diagram depicting a procedure in an example implementation for determining a color space distance between a foreground and a background of an image.

FIG. 9 depicts a procedure 900 in an example implementation of automatic trimap generation and image segmentation for object selection in accordance with one or more implementations. Given an image and an upsampled mask for the image, such as image 202 and upsampled mask 216 as illustrated in FIG. 2, a color value for each pixel of the upsampled image mask is determined based on a value of a corresponding pixel in the image (block 902). The content comparison module 208 of the trimap generation system 126, for instance, processes the image 202 to determine a pixel value for each pixel in the image 202, and assigns the determined pixel value to a corresponding pixel in the upsampled mask for the image.

Pixels of the upsampled image mask are then separated into foreground bins and background bins based on the assigned color values and a determination of whether the pixel is classified as a foreground pixel or a background pixel (block 904). The content comparison module 208 of the trimap generation system 126, for instance, designates a preliminary pixel threshold value and classifies pixels in the upsampled mask 216 that satisfy the preliminary pixel threshold value as foreground pixels. Similarly, the content comparison module 208 classifies pixels in the upsampled mask 216 that do not satisfy the preliminary pixel threshold value as background pixels. Using this classification and the determined color values for each pixel in the upsampled mask, a number of foreground bins and background bins are created, where each bin represents a division of color space. Thus, a foreground pixel is assigned to one of the foreground bins based on a pixel value of the corresponding pixel in the image.

A color space distance between the foreground pixels and background pixels of the image is then determined (block 906). The content comparison module 208, for instance, computes the color space distance as a function of the number of foreground pixels in the bins, the number of background pixels in the bins, and a number of bins generated to separate pixels of the upsampled mask. By determining a color space distance between foreground and background pixels of the upsampled image mask, the content comparison module provides the image processing system 112 with an awareness of content included in the image 202, such that the trimap generation system 126 of the image processing system 112 can adaptively generate trimaps for a range of different images, such as images having clear visual differences between foreground and background portions, as well as images having visually similar foreground and background portions. Furthermore, the image processing system 112 is operable independent of any user input, intervention, or other feedback to guide the process of generating the trimap 114.

Example System and Device

Figure 10:
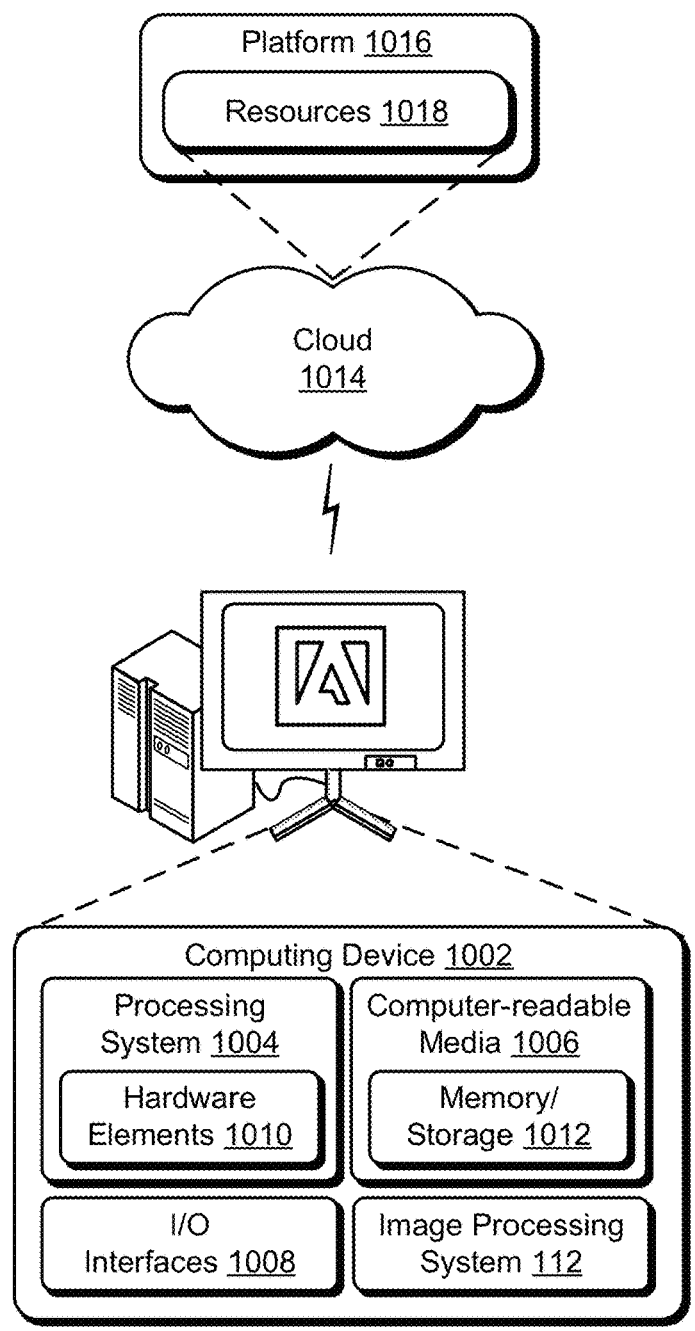
FIG. 10 illustrates an example system including various components of an example device that can be implemented as any type of computing device as described and/or utilize with reference to FIGS. 1-9 to implement the techniques described herein.

FIG. 10 illustrates an example system generally at 1000 that includes an example computing device 1002 that is representative of one or more computing systems and/or devices that may implement the various techniques described herein. This is illustrated through inclusion of the image processing system 112. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital content design creation environment, a method implemented by at least one computing device, the method comprising:
   receiving, by the at least one computing device, an image and an image mask for the image, the image mask including a plurality of pixels that are each associated with a value indicating a probability that the pixel corresponds to a foreground or a background of the image;
   generating, by the at least one computing device, an upsampled mask for the image by up sampling the image mask to a resolution of the image;
   classifying, by the at least one computing device, each of the plurality of pixels of the upsampled mask as consisting either the foreground or the background of the image;
   generating, by the at least one computing device, a histogram distance using the classified plurality of pixels, the histogram distance describing a distance between a color space of the foreground of the image and a color space of the background of the image;
   determining, by the at least one computing device, trimap settings for the image based on the histogram distance and independent of input specifying one or more of the trimap settings; and
   generating, by the at least one computing device and independent of user intervention, a trimap for the image using the determined trimap settings.

2. The method as described in claim 1, wherein the image mask is automatically generated for the image using a neural network.

3. The method as described in claim 1, wherein the image mask is of a lower resolution than the image.

4. The method as described in claim 1, wherein generating the upsampled mask for the image is performed using bilinear interpolation or bicubic interpolation.

5. The method as described in claim 1, wherein the trimap settings specify a foreground threshold pixel value and pixels of the image that satisfy the foreground threshold pixel value are indicated as foreground pixels in the trimap.

6. The method as described in claim 1, wherein the trimap settings specify a background threshold pixel value and pixels of the image that satisfy the background threshold pixel value are indicated as background pixels in the trimap.

7. The method as described in claim 1, wherein determining the trimap settings for the image based on the histogram distance comprises applying a trained image trimap model to the histogram distance and identifying trimap settings based on one or more other images each having color space distances that are similar to the generated histogram distance.

8. The method as described in claim 1, wherein classifying each of the plurality of pixels of the upsampled mask comprises:
   designating, by the at least one computing device, a preliminary foreground threshold pixel value;
   classifying pixels of the upsampled mask that satisfy the preliminary foreground threshold pixel value as corresponding to the foreground of the image; and
   classifying pixels of the up sampled mask that do not satisfy the preliminary foreground threshold pixel value as corresponding to the background of the image.

9. The method as described in claim 1, wherein generating the histogram distance comprises:
   generating, by the at least one computing device, a plurality of foreground pixel bins and a plurality of background pixel bins, each of the plurality of foreground pixel bins and each of the plurality of background pixel bins representing a different range of color space values;
   assigning, by the at least one computing device, each of the plurality of pixels of the upsampled mask to a respective one of the foreground pixel bins or the background pixel bins based on the classifying and on a color space value of a corresponding pixel in the image; and
   generating the histogram distance as a function of the differences between color space values in the plurality of foreground pixel bins and the plurality of background pixel bins.

10. The method as described in claim 1, further comprising outputting, by the at least one computing device, a selected object for the image by applying the trimap to the image and including pixels of the image identified as foreground pixels or background pixels by the trimap in the selected object.

11. In a digital medium image processing environment, a method implemented by at least one computing device, the method comprising:
    receiving, by the at least one computing device, an image and an image mask for the image, the image mask including a plurality of pixels that are each associated with a value indicating a probability that the pixel corresponds to a foreground of the image;
    classifying, by the at least one computing device, each of the plurality of pixels of the image mask as consisting either a foreground or a background of the image;
    determining, by the at least one computing device, a color value for each of the plurality of pixels of the image mask based on a pixel value of a corresponding pixel in the image;
    determining, by the at least one computing device, a distance between a color space of the foreground of the image and the background of the image based on the classification and the determined color values; and
    determining, by the at least one computing device, threshold foreground and background pixel values for the image by applying a trained image trimap model to the determined color space distance;
    generating, by the at least one computing device and independent of input specifying one or more trimap settings, a trimap for the image using the threshold foreground and background pixel values; and
    outputting, by the at least one computing device, a selected object from the image by applying the trimap to the image.

12. The method as described in claim 11, wherein outputting the selected object from the image comprises applying a dense conditional random field model to the generated trimap.

13. The method as described in claim 11, wherein classifying each of the plurality of pixels of the image mask comprises:
    designating, by the at least one computing device, a preliminary foreground threshold pixel value;
    classifying, by the at least one computing device, pixels of the image mask that satisfy the preliminary foreground threshold pixel value as corresponding to the foreground of the image; and
    classifying pixels of the image mask that do not satisfy the preliminary foreground threshold pixel value as corresponding to the background of the image.

14. The method as described in claim 11, wherein the image mask is received from a neural network that generated the image mask from the image.

15. In a digital image processing environment, a trimap generation system comprising:
 a mask upsampling module implemented at least partially in hardware of a computing device to upsample an image mask for an image to a resolution of the image;
 a content comparison module implemented at least partially in hardware of a computing device to:
  assign individual pixels of the upsampled image mask as consisting either a foreground or a background of the image; and
  determine a distance between respective color spaces of the foreground and the background of the image based on the pixel assignments;
 a trimap settings module implemented at least partially in hardware of a computing device to automatically generate image trimap settings by applying a trained image trimap model to the determined distance between color spaces of the foreground and the background of the image; and
 a trimap output module implemented at least partially in hardware of a computing device to automatically generate, independent of input specifying one or more trimap settings, a trimap using the automatically generated image trimap settings.

16. The system as described in claim 15, wherein the mask upsampling module upsamples the image mask using bilinear interpolation, bicubic interpolation, or stepwise interpolation.

17. The system as described in claim 15, wherein the trimap settings specify a foreground threshold pixel value and pixels of the image that satisfy the foreground threshold pixel value are indicated as foreground pixels in the trimap.

18. The system as described in claim 15, wherein the trimap settings specify a background threshold pixel value and pixels of the image that satisfy the background threshold pixel value are indicated as background pixels in the trimap.

19. The system as described in claim 15, further comprising a subject selection system implemented at least partially in hardware of a computing device to output a selected object for the image by applying the trimap to the image and including pixels of the image identified as foreground pixels by the trimap in the selected object.

20. The system as described in claim 15, further comprising a subject selection system implemented at least partially in hardware of a computing device to output a selected object for the image by applying the trimap to the image and including pixels of the image identified as background pixels by the trimap in the selected object.

* * * * *

UNITED STATES PATENT AND TRADEMARK OFFICE
CERTIFICATE OF CORRECTION

PATENT NO. : 10,692,221 B2
APPLICATION NO. : 16/035410
DATED : June 23, 2020
INVENTOR(S) : I-Ming Pao and Zhe Lin It is certified that error appears in the above-identified patent and that said Letters Patent is hereby corrected as shown below:

Column 21, Line 12, after "image by", delete "up sampling", insert -- upsampling --, therefor.

Column 21, Line 61, after "pixels of the", delete "up sampled", insert -- upsampled --, therefor.

Signed and Sealed this
First Day of September, 2020

Andrei Iancu
*Director of the United States Patent and Trademark Office*